(12) United States Patent
Choi et al.

(10) Patent No.: US 10,259,298 B2
(45) Date of Patent: Apr. 16, 2019

(54) IMPACT BEAM STRUCTURE OF CFRP DOOR FOR VEHICLE

(71) Applicants: Hyundai Motor Company, Seoul (KR); Kia Motors Corporation, Seoul (KR)

(72) Inventors: Seung Il Choi, Seoul (KR); Jae Hyuk Cheong, Hwaseong-si (KR); Jeong Hyeon Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 15 days.

(21) Appl. No.: 15/607,622

(22) Filed: May 29, 2017

(65) Prior Publication Data
US 2018/0134129 A1    May 17, 2018

(30) Foreign Application Priority Data
Nov. 15, 2016    (KR) .................. 10-2016-0152002

(51) Int. Cl.
*B60J 5/00*    (2006.01)
*B60J 5/04*    (2006.01)

(52) U.S. Cl.
CPC .......... *B60J 5/0444* (2013.01); *B60J 5/0425* (2013.01); *B60J 5/0437* (2013.01); *B60J 5/042* (2013.01); *B60J 5/0422* (2013.01); *B60J 5/0438* (2013.01); *B60J 5/0443* (2013.01); *B60Y 2304/03* (2013.01)

(58) Field of Classification Search
CPC ....... B60R 19/18; B60J 5/0437; B60J 5/0455; B60J 5/0443; B60J 5/0483; B32B 2262/106; B32B 2307/558; C08L 63/00; C08L 61/14; B64C 1/062
USPC ............. 296/146.6, 146.5, 187.12; 180/274; 293/120
See application file for complete search history.

(56) References Cited

U.S. PATENT DOCUMENTS

| | | | | |
|---|---|---|---|---|
| 4,684,166 A * | 8/1987 | Kanodia | ............... | B60J 5/0447 296/146.6 |
| 5,080,427 A * | 1/1992 | Sturrus | ............... | B60J 5/0444 296/146.6 |
| 5,232,261 A * | 8/1993 | Kuroda | ............... | B60J 5/0444 296/146.4 |
| 5,580,120 A | 12/1996 | Nees et al. | | |
| 5,785,376 A * | 7/1998 | Nees | ............... | B60J 5/0444 296/146.6 |
| 5,813,719 A * | 9/1998 | Kowalski | ............... | B60J 5/0444 296/146.6 |
| 6,053,565 A * | 4/2000 | Cho | ............... | B60J 5/0447 296/146.6 |
| 6,276,105 B1 * | 8/2001 | Wycech | ............... | B60J 5/0444 293/120 |

(Continued)

FOREIGN PATENT DOCUMENTS

| CN | 102791532 A | 11/2012 |
|---|---|---|
| JP | 2006273272 A | 10/2006 |

(Continued)

*Primary Examiner* — Kiran B Patel
(74) *Attorney, Agent, or Firm* — Slater Matsil, LLP

(57) ABSTRACT

An impact beam structure of a CFRP door for a vehicle is disclosed. A outer impact beam and an inner impact beam are separately molded and then coupled to each other such that an impact beam is formed. The impact beam is coupled to an inner panel of the CFRP door for the vehicle.

7 Claims, 4 Drawing Sheets

(56) References Cited

U.S. PATENT DOCUMENTS

| | | | | |
|---|---|---|---|---|
| 6,591,577 | B2* | 7/2003 | Goto | B60J 5/0444 138/115 |
| 6,679,540 | B1* | 1/2004 | Graber | B60J 5/0444 296/146.6 |
| 7,066,508 | B1* | 6/2006 | Baccouche | B60R 19/18 293/120 |
| 7,086,686 | B2* | 8/2006 | Bullmann | B60J 5/0444 188/377 |
| 7,819,462 | B1* | 10/2010 | Owens | B29C 70/222 296/146.6 |
| 7,837,255 | B1* | 11/2010 | Okutsu | B60J 5/0425 280/735 |
| 8,226,154 | B2* | 7/2012 | Nakano | B60J 5/0429 296/146.6 |
| 9,487,066 | B1* | 11/2016 | Hansen | B60J 5/0461 |
| 2002/0069609 | A1* | 6/2002 | Nees | B60J 5/0444 296/202 |
| 2003/0042754 | A1* | 3/2003 | Seo | B60J 5/0437 296/146.6 |
| 2004/0189043 | A1* | 9/2004 | Guiles | B21D 47/01 296/146.6 |
| 2005/0264028 | A1* | 12/2005 | Bodin | B60J 5/0425 296/146.6 |
| 2007/0145771 | A1* | 6/2007 | Tanaka | B60J 1/17 296/146.6 |
| 2007/0187986 | A1* | 8/2007 | Wikstrom | B60J 5/0429 296/146.6 |
| 2008/0111385 | A1* | 5/2008 | Haneda | B60R 19/023 293/102 |
| 2008/0164716 | A1* | 7/2008 | Frank | B60J 5/0447 296/146.6 |
| 2008/0189949 | A1* | 8/2008 | Vikstrom | B21D 5/086 29/897.2 |
| 2013/0017406 | A1 | 1/2013 | Kinefuchi et al. | |
| 2013/0049397 | A1* | 2/2013 | Cohoon | B60J 5/0425 296/146.6 |
| 2013/0140845 | A1* | 6/2013 | Jeon | B60J 5/0455 296/146.6 |
| 2013/0147229 | A1* | 6/2013 | Han | B60J 5/0437 296/146.6 |
| 2014/0110964 | A1* | 4/2014 | Schijve | B60J 5/0422 296/146.6 |
| 2014/0367947 | A1* | 12/2014 | Torii | B60R 21/0428 280/730.2 |
| 2014/0375078 | A1* | 12/2014 | Fujihara | B60J 5/0443 296/146.6 |
| 2015/0151359 | A1* | 6/2015 | Hu | B22D 19/02 164/75 |
| 2015/0202950 | A1* | 7/2015 | Garimella | B60J 5/0443 49/501 |
| 2017/0166038 | A1* | 6/2017 | Jang | B21D 22/022 |
| 2017/0291476 | A1* | 10/2017 | Schneider | B60J 5/0444 |
| 2017/0326954 | A1* | 11/2017 | Peidro Aparici | B60J 5/0427 |
| 2018/0162206 | A1* | 6/2018 | Seong | B60J 5/0484 |

FOREIGN PATENT DOCUMENTS

| | | |
|---|---|---|
| JP | 5513084 B2 | 6/2014 |
| JP | 2016097860 A | 5/2016 |
| JP | 5949598 B2 | 7/2016 |

\* cited by examiner

IMPACT BEAM STRUCTURE OF CFRP DOOR FOR VEHICLE

CROSS-REFERENCE TO RELATED APPLICATIONS

This application claims priority to and the benefit of Korean Patent Application No. 10-2016-0152002 filed in the Korean Intellectual Property Office on Nov. 15, 2016, the entire contents of which are incorporated herein by reference.

TECHNICAL FIELD

Embodiments of the present invention relates to an impact beam structure of a vehicle door manufactured by using carbon fiber reinforced plastics (CFRP).

BACKGROUND

In general, a vehicle door serves to open and close a cabin formed by a vehicle body.

In addition, an impact beam is installed inside the vehicle door to protect a passenger by preventing the door from being excessively pushed into the cabin when a side collision occurs.

The vehicle door is typically manufactured using steel, but recently, low weight and high strength CFRP has been used for light-weight of a vehicle to thereby reduce fuel consumption.

In application of an impact beam to the CFRP door, a cross section structure of an impact beam needs to be optimized and the weight needs to be reduced by reducing a number of parts related to installation.

The above information disclosed in this Background section is only for enhancement of understanding of the background of the invention and therefore it may contain information that does not form the prior art that is already known in this country to a person of ordinary skill in the art.

SUMMARY

Embodiments of the present invention relate to an impact beam structure of a vehicle door manufactured by using carbon fiber reinforced plastics (CFRP). Particular embodiments relate to an impact beam structure of a CRFP door for a vehicle, which is manufactured by applying a roll-forming method and bonded to an inner panel of the CFRP door by using an adhesive.

Embodiments of the present invention provide an impact beam structure of a CFRP door for a vehicle, which enables simple installation of an impact beam to a vehicle door manufactured by using a CFRP material and minimization of a cross-sectional structure of the impact beam to thereby effectively respond to side collision, and can prevent deterioration of exterior appearance of the CFRP by installation of an impact beam that appropriately matches an inner panel of the CFRP door.

According to an exemplary embodiment of the present invention, an impact beam structure of a CFRP door is provided for a vehicle. The impact beam is formed by separately molding an outer impact beam and an inner impact beam and coupling the outer impact panel and the inner impact panel to each other. The outer impact panel and the inner impact panel are coupled to an inner panel of the vehicle.

The inner panel may be made of a CFRP material.

The impact beam may be roll-forming molded.

The outer impact beam and the inner impact beam may respectively include one or more closed cross sections.

The outer impact beam and the inner impact beam each may include two closed cross sections and a connection flange that connects the two closed cross sections.

The closed cross sections may have quadrangular box shapes.

The two closed cross sections and the connection flange of the outer impact beam may be arranged to be respectively overlapped with the two closed cross sections and the connection flange of the inner impact beam.

The connection flange of the outer impact beam and the connection flange of the inner impact beam may be bonded to each other by spot welding.

The inner panel may include a stepped portion and a side surface, a front end of the outer impact beam may be laid on the stepped portion and bonded thereto by an adhesive, and a front end of the inner impact beam may be bonded to the side surface by the adhesive.

The inner panel may include a stepped portion and an inner surface that faces inside a cabin, a front end of the outer impact beam may be laid on the stepped portion and then bonded thereto by an adhesive, and a front end of the inner impact beam may be bonded to the inner surface by the adhesive.

According to the exemplary embodiment of the present invention, an impact beam of a CFRP door for a vehicle is manufactured to have optimal multiple closed cross sections by a roll-forming method so that the weight can be reduced and at the same time rigidity can be improved, thereby more safely protecting a passenger when the vehicle experiences a side collision.

Since the impact beam is coupled to an inner panel made of a CFRP material by an adhesive, a number of parts related to the installation of the impact beam can be reduced, and accordingly, the number of parts and the weight can be reduced and at the same time noise from opening and closing of the door can be reduced, thereby improving marketability. Further, deterioration of an exterior appearance of the door due to the door impact beam can be prevented.

DETAILED DESCRIPTION OF ILLUSTRATIVE EMBODIMENTS

Hereinafter, an exemplary embodiment of the present invention will be described in detail with reference to the accompanying drawings.

Figure 1:
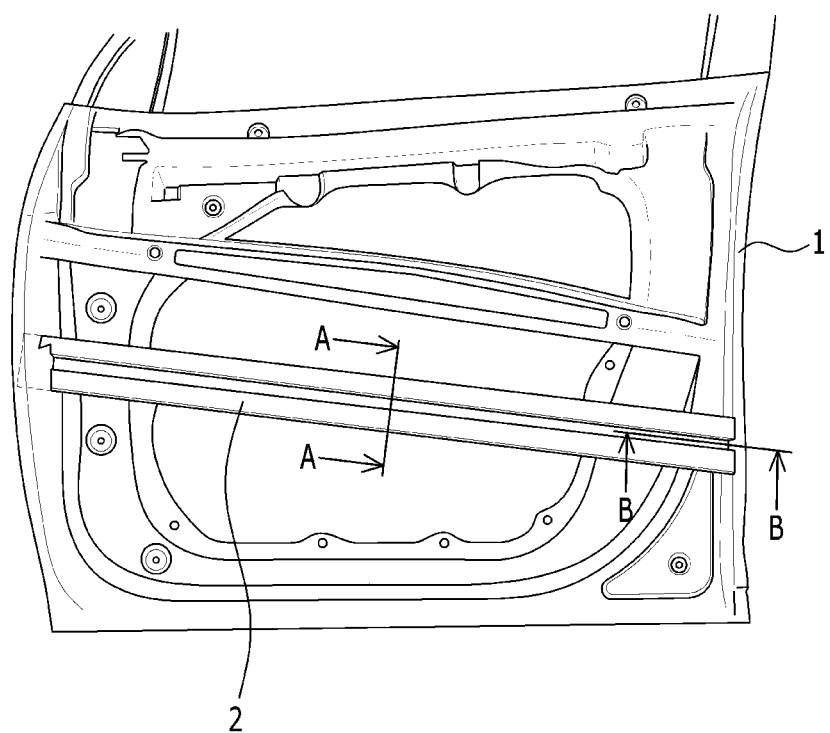
FIG. 1 is a front view of a state in which an impact beam is installed in a CFRP door for a vehicle.

Referring to FIG. 1, a vehicle door to which an impact beam according to an exemplary embodiment of the present invention is applied is manufactured using a carbon fiber reinforced plastics (CFRP) material.

The CFRP door may include an inner panel 1 that faces inside a cabin of the vehicle.

The inner panel 1 may have a quadrangular shape having a predetermined width and height.

An impact beam 20 substantially having a long rectangular shape may be coupled to an inner surface of the inner panel 1, which faces inside the cabin.

The impact beam 2 may be disposed at front and rear sides of the vehicle along a length direction of the vehicle and coupled to the inner panel 1.

The impact beam 2 may be inclined along a height direction of the vehicle, and this is not restrictive.

Figure 2:
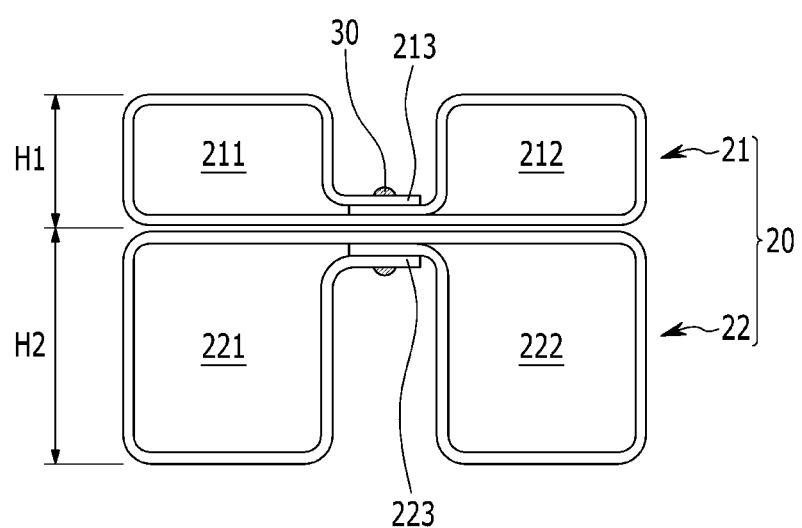
FIG. 2 is a cross-sectional view of FIG. 1, taken along the line A-A.

Referring to FIG. 2, the impact beam 2 may have a structure in which an outer impact beam 21 and an inner impact beam 22 are coupled to each other.

Here, the outer side implies a direction that faces outside the cabin along the vehicle and the inner side implies a direction that faces the inside the cabin of the vehicle.

The outer impact beam 21 and the inner impact beam 22 may be formed by forming molding steel.

The outer impact beam 21 and the inner impact beam 22 may be coupled by being folded to each other.

The outer impact beam 21 may include two closed cross sections 211 and 212 and a connection flange 213 that connects the two closed cross sections 211 and 212.

The two closed cross sections 211 and 212 may respective have quadrangular boxes, but this is not restrictive. The closed cross sections 211 and 212 may have other shapes having one or more of closed cross sections.

The inner impact beam 22 may include two closed cross sections 211 and 222 and a connection flange 223 that connects the two closed cross sections 221 and 222.

The two closed cross sections 221 and 222 may respective have quadrangular boxes, but this is not restrictive. The closed cross sections 221 and 222 may have other shapes having one or more of closed cross sections.

When the outer impact beam 21 and the inner impact beam 22 are arranged to be overlapped with each other, the two closed cross sections 211 and 212 of the outer impact beam 21 may be arranged to be overlapped over the two closed cross sections 221 and 222 of the inner impact beam 22 and the connection flange 213 of the outer impact beam 21 may be arranged to be overlapped over the connection flange 223 of the inner impact beam 22.

As described, when the outer impact beam 21 and the inner impact beam 22 are overlapped with each other, the respective connection flange 213 and 223 may be bonded to each other through, for example, spot welding 30.

Preferably, a height H1 of the outer impact beam 21 may be set to be lower than a height H2 of the inner impact beam 22, but may be modified depending on a type of a vehicle, and since rigidity of the impact beam 2 can be changed by properly adjusting the height or the closed cross area, the impact beam 2 according to the exemplary embodiment of the present invention may commonly applied to any vehicle.

Figure 3:
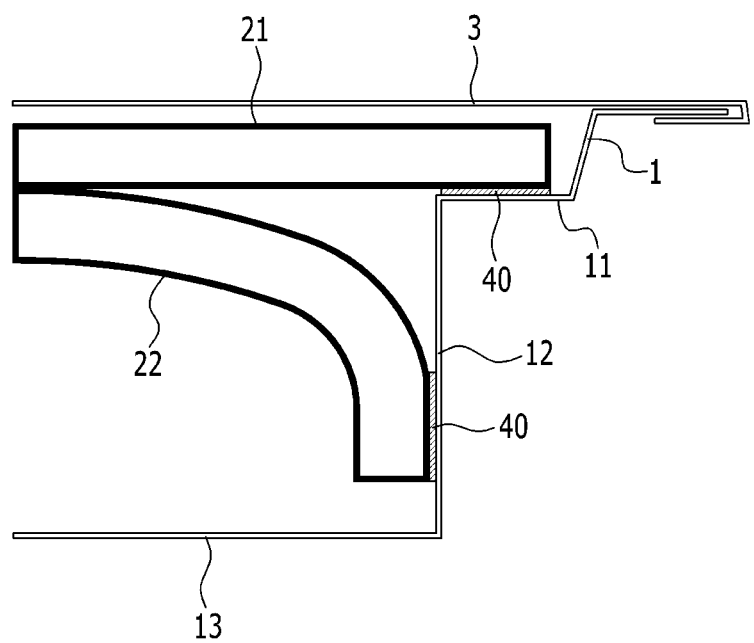
FIG. 3 is a cross-sectional view of FIG. 1, taken along the line B-B.

Referring to FIG. 3, the inner panel 1 is coupled with an outer panel 3 such that the CFRP door can be formed.

The inner panel 1 and the outer panel 3 may be coupled to each other while forming a predetermined inner space therebetween.

The impact beam 2 is inserted into the inner space and thus coupled with the inner panel 1.

A stepped portion 11 that is stepped toward the inside the cabin is formed in the inner panel 1 and a front end of the outer impact beam 21 is laid on the stepped portion 11 and then bonded by an adhesive 40.

A front end of the inner impact beam 22 is closely attached to a side surface of the inner panel 1 and then bonded thereto by the adhesive 40.

Figure 4:
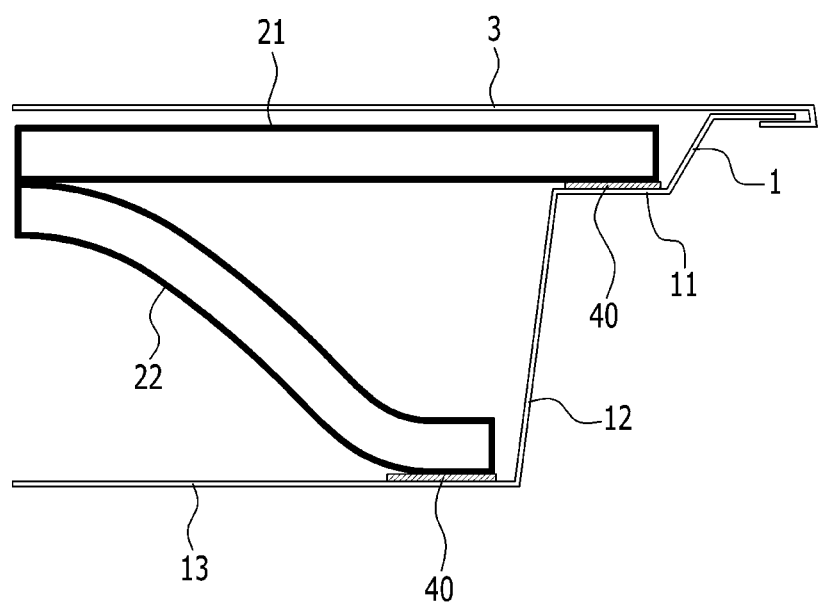
FIG. 4 is a cross-sectional view of FIG. 1, taken along the line B-B according to another exemplary embodiment of the present invention.

Referring to FIG. 4, as another exemplary embodiment of the present invention, an inner panel 1 is provided with an inner surface 13 that faces inside a cabin, and a front end of an inner impact beam 22 is closely attached to the inner surface 13 and then bonded thereto by an adhesive.

Such a structure in which the impact beam 2 and the inner panel 1 are bonded to each other by the adhesive can improve assembly quality and productivity of the impact beam 2, and a number of parts and the weight can be reduced because no parts related to installation of the impact beam 2 are needed.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. An impact beam structure of a door for a vehicle, wherein the impact beam structure formed by separately molding an outer impact beam made of carbon fiber reinforced plastics (CFRP) and an inner impact beam made of CFRP and coupling the outer impact beam and the inner impact beam to each other, the impact beam structure to be coupled to an inner panel of the vehicle door, wherein the outer impact beam and the inner impact beam each comprises two closed cross sections and a connection flange that connects the two closed cross sections and wherein the two closed cross sections and the connection flange of the outer impact beam are arranged to be respectively overlapped with the two closed cross sections and the connection flange of the inner impact beam.

2. The impact beam structure of claim 1, wherein the inner panel is made of a CFRP material.

3. The impact beam structure of claim 1, wherein the inner impact beam is roll-forming molded.

4. The impact beam structure of claim 1, wherein the closed cross sections have quadrangular box shapes.

5. The impact beam structure of claim 1, wherein the connection flange of the outer impact beam and the connection flange of the inner impact beam are bonded to each other by spot welding.

6. The impact beam structure of claim 1, wherein the inner panel comprises a stepped portion and a side surface, wherein a front end of the outer impact beam is laid on the stepped portion and bonded thereto by an adhesive, and wherein a front end of the inner impact beam is bonded to the side surface by the adhesive.

7. The impact beam structure of claim 1, wherein the inner panel comprises a stepped portion and an inner surface that faces inside a cabin, wherein a front end of the outer impact beam is laid on the stepped portion and then bonded thereto by an adhesive, and wherein a front end of the inner impact beam is bonded to the inner surface by the adhesive.

* * * * *